Patented Apr. 18, 1944

2,347,128

UNITED STATES PATENT OFFICE 2,347,128

PRODUCTION OF DITHIOCARBAMATES

William F. Russell, Norwalk, Conn., assignor to R. T. Vanderbilt Company, Incorporated, New York, N. Y., a corporation of New York No Drawing. Application May 25, 1943, Serial No. 488,439

6 Claims. (Cl. 260—500)

This invention relates to improvements in the production of selenium salts of dithiocarbamic acids. More particularly, this invention provides a direct method affording important improvements in efficiency and economy.

In conventional practice, an aqueous solution of an alkali-metal selenite and an aqueous solution of an alkaline dithiocarbamate are mixed and the mixed solution is acidified to precipitate the selenium dithiocarbamate which is then separated from the aqueous solution by filtration or extraction with an organic solvent. Purification of the products thus obtained frequency involves severe difficulties. The salts formed by acidification, remaining in the aqueous solution, represent a consumption of alkaline material and of acid.

I have now discovered that selenium dioxide in alcoholic solution, probably as an alkyl selenite, reacts directly with secondary amines and carbon disulphide to form selenium dithiocarbamates corresponding to the amine. My application of this discovery simplifies the production operation and accomplishes important savings of raw materials. Selenium dithiocarbamates of high purity, or easily purified, are the direct product of my method.

In carrying out my new method, I react a secondary amine and carbon disulphide with selenium dioxide in alcoholic solution to precipitate, as a crystalline solid or oily liquid, the selenium dithiocarbamate. The selenium dioxide is with advantage reacted in solution in an aliphatic alcohol having not more than four carbon atoms. The secondary amine may be of the aliphatic, alicyclic, heterocyclic, aralkyl, or mixed aryl-alkyl series.

For example: 33.28 grams of pure selenium dioxide were dissolved in 750 cubic centimeters of isopropanol at moderate temperature, that is somewhat below 45° C. The solution was clear and colorless; if the temperature exceeds about 45° C. red selenium tends to form. The alcoholic solution, in a glass vessel suspended in a water bath at a temperature of about 15° C., was vigorously stirred while 91.35 grams of carbon disulphide were rapidly added and, thereafter, while 87.75 grams of diethylamine were added at a rate limited to avoid any substantial temperature rise. About one-half hour was required for addition of the diethylamine. Golden yellow crystals began to precipitate shortly after addition of the diethylamine was begun. The reaction mixture was left in the vessel in the water bath for one hour after addition of the diethylamine was completed. The precipitate was then filtered from the alcoholic solution and dried; the temperature should be limited not to exceed about 35°-40° C. during drying. 187 grams of selenium diethyl dithiocarbamate (or an equimolar mixture of divalent selenium diethyl dithiocarbamate and tetraethyl thiuram disulphide instead of the tetravalent selenium diethyldithiocarbamate as noted below) were recovered, a yield 93% of the theoretical. This yield can be improved by further cooling or by limiting the proportiton of isopropanol. The remaining isopropanol solution contained the water of reaction.

The process may be carried out in the same way and with equally satisfactory results with methanol. Alcohols providing a substantial differential between the solubility of selenium dioxide and the selenium dithiocarbamate are generally useful in carrying out my invention. The aliphatic alcohols having four carbon atoms or less, and particularly methanol and isopropanol, are particularly advantageous. The higher aliphatic alcohols, and to some extent butanol, exhibit increasing solubility for the selenium dithiocarbamates decreasing the yields. Lower separation temperatures, and the avoidance of an excess of the alcohol over that required to dissolve the selenium dioxide at the reaction temperature, however, exert a contrary effect.

The method is generally useful with secondary amines to produce corresponding dithiocarbamates. Dimethylamine, diethylamine, diisopropylamine, dibutylamine, diamylamine produce, respectively, selenium dimethyl dithiocarbamate, selenium diethyl dithiocarbamate, selenium diisopropyl dithiocarbamate, etc. for example. N-ethyl aniline produces selenium phenyl ethyl dithiocarbamate. Dibenzylamine produces selenium dibenzyl dithiocarbamate. Morpholine (heterocyclic) and dicyclohexylamine (alicyclic) produce the corresponding selenium dithiocarbamate. Dimethylamine is commercially available only in aqueous solution; the dimethylamine may be vaporized from the solution and supplied to the reaction in vapor phase or the aqueous solution may be used directly.

The alcohol solution remaining after separation of the dithiocarbamate, containing the water of reaction, may be reused in the process several times before the accumulating water content seriously interferes with the reaction. Commercial aqueous dimethylamine, for example, can be used directly, as in the foregoing example, and the process can be repeated three or four times with good yields before the isopropanol becomes too dilute for effective reuse.

For example: 146 grams of aqueous dimethylamine (24.7% dimethylamine) were gradually run into a solution of 22.19 grams of pure selenium dioxide and 60.9 grams of carbon disulfide in 400 cubic centimeters of isopropanol. The reaction mixture was placed in cold water and was kept well stirred during the addition of the dimethylamine. The selenium dimethyldithiocarbamate came out as a finely divided, crystalline, light yellow precipitate. This was filtered off and dried at a moderate temperature. The product weighed 106 grains or about 95% of the theoretical yield. The alcoholic filtrate was reused in the same process four more times (5 runs in all).

Since isopropanol forms constant boiling mixtures with water, the recovery of the concentrated alcohol from dilute aqueous solutions is not easily performed. However, methanol is readily recovered in concentrations of 99% or better from such solutions by rectification. Thus, methanol has this advantage with respect to recovery of the alcohol for reuse.

The reaction is exothermic with the amines above mentioned other than diisopropylamine and N-ethyl aniline. With these last two, the reaction mixture is with advantage heated to about 100° C. to complete the reaction and then cooled for separation of the product. With the others appropriate steps should be taken to dissipate the heat of reaction.

With dibutylamine and diamylamine the products separate as oil liquids, instead of as solids, which are soluble in petroleum fractions of gasoline boiling range and which may thus be purified by extraction followed by stripping of the gasoline fraction under subatmospheric pressure to limit the temperature to which the product is subjected. The product with dibutylamine is less soluble in such fractions than with diamylamine.

The product of the reaction frequently, if not usually, appears as an equimolar mixture of the divalent selenium dithiocarbamate and the corresponding thiruram disulphide instead of as the tetravalent selenium dithiocarbamate. The type reaction involved appears to be as follows:

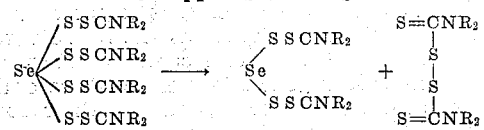

where R may be an aliphatic, alicyclic, heterocyclic, or aralkyl radical. $R_2$ may also consist of an aryl radical and one of the afore-mentioned, attached to the same nitrogen. That is, for example, tetravalent selenium diethyl dithiocarbamate becomes an equimolar mixture of divalent selenium diethyl dithiocarbamate, melting point 110° C., and tetraethyl thiuram disulphide, melting point 72°–74° C. As ordinarily determined, the melting point of the product of the example of the method of the invention previously given will approximate 68°–70° C. When this conversion occurs, separate crystals of the two substances can usually be seen under the microscope and, in the case of the diethyl compound, the two components can be separated by extraction with cold benzene.

Glass, glass-lined, stainless steel and probably aluminum reaction vessels can be used without discoloration of the product.

I claim:

1. In the production of selenium salts of dithiocarbamic acids, the improvement which comprises reacting a secondary amine and carbon disulphide with selenium dioxide in alcoholic solution.

2. In the production of selenium salts of dithiocarbamic acids, the improvement which comprises reacting a secondary amine and carbon disulphide with selenium dioxide in solution in an aliphatic alcohol having not more than four carbon atoms.

3. In the production of selenium salts of dithiocarbamic acids, the improvement which comprises reacting a secondary amine and carbon disulphide with selenium dioxide in solution in isopropanol.

4. In the production of selenium salts of dithiocarbamic acids, the improvement which comprises reacting a secondary amine and carbon disulphide with selenium dioxide in solution in methanol.

5. In the production of selenium salts of dithiocarbamic acids, the improvement which comprises reacting a dialkyl amine and carbon disulphide with selenium dioxide in alcoholic solution.

6. In the production of selenium salts of dithiocarbamic acids, the improvement which comprises reacting an alkyl aryl amine and carbon disulphide with selenium dioxide in alcoholic solution.

WILLIAM F. RUSSELL.